United States Patent [19]
Holman et al.

[11] Patent Number: 5,146,677
[45] Date of Patent: Sep. 15, 1992

[54] RAIL ANCHOR REMOVER

[76] Inventors: Curtis W. Holman, 21426 Shamrock La.; Bobby A. Moser, 1419 S. 217th St., both of Elkhorn, Nebr. 68022

[21] Appl. No.: 665,267

[22] Filed: Mar. 6, 1991

[51] Int. Cl.⁵ .............................................. B23P 11/00
[52] U.S. Cl. ................................. 29/243.5; 29/243.56
[58] Field of Search .................. 29/235, 239, 243.5, 29/243.56, 283.5

[56] References Cited
U.S. PATENT DOCUMENTS

| | | | |
|---|---|---|---|
| 4,471,526 | 9/1984 | Zaltsberg | 29/235 |
| 4,494,463 | 1/1985 | Young et al. | 29/243.5 |
| 4,726,107 | 2/1988 | Knudson | 29/243.5 |
| 4,918,797 | 4/1990 | Watkins et al. | 29/243.5 |

Primary Examiner—J. J. Swann
Attorney, Agent, or Firm—Zarley, McKee, Thomte, Voorhees & Sease

[57] ABSTRACT

A rail anchor remover comprising a frame which receives a rail, having said anchors mounted thereon, and which removes the rail anchors from the rail as the rail anchor remover is moved longitudinally along the rail.

16 Claims, 4 Drawing Sheets

RAIL ANCHOR REMOVER

BACKGROUND OF THE INVENTION

This invention relates to a rail anchor remover and more particularly to a rail anchor remover which is moved along the length of a suspended rail to automatically remove the anchors from the rail.

The rails of a railroad track are conventionally secured to cross ties by means of spikes driven thru the plates into the tie. In some situations, the rail tends to move longitudinally with respect to the cross tie. Such longitudinal movment is prevented through the use of rail anchors.

The anchors are normally secured to the rail on opposite sides of the cross tie so that the anchor will bear against the cross tie. The anchor transmits longitudinal forces to the tie so as to prevent longitudinal movement of the rail with respect to the cross tie. One type of rail anchor which is commonly used is a drive-on rail anchor. The anchor is driven or forced onto the rail base and remains so positioned due to the design of the anchor.

When a rail is to be replaced or renovated, the spikes which secure the tie plates and rail to the ties are first removed. The rail anchors must then be removed from the rails. Heretofore, the drive-on rail anchors were removed by an individual swinging a sledge hammer, striking the drive-on rail anchor and thereby driving the anchor from the base of the rail. The rail, after the anchors had been removed therefrom, is placed out of the track by either a roller mechanism or rail tongs attached to a rubber tired crane moving along the track. The prior art method of removing the drive-on rail anchors requires considerable manpower. Further, injuries to the person swinging the sledge hammer frequently occur.

It is therefore an object of the invention to provide a drive-on rail anchor remover.

A further object of the invention is to provide a drive-on rail anchor remover which removes the rail anchors from the rail and which also facilies the rail being placed out of the track.

A further object of the invention is to provide a rail anchor remover which may be moved in opposite directions on the rail.

Still another object of the invention is to provide a rail anchor remover which positions the removed anchors in the proper position outside the track for subsequent retrieval.

Still another object of the invention is to provide a drive-on anchor remover which is easy and safe to use.

Still another object of the invention is to provide a rail anchor remover which is economical of manufacture, durable in use and which may be used with various sizes of rail.

These and other objects of the present invention will be apparent to those skilled in the art.

DESCRIPTION OF THE DRAWINGS

FIG. 1 is a perspective view of the anchor remover of this invention mounted on a rail and being supported by a crane or the like;

SUMMARY OF THE INVENTION

Figure 1:
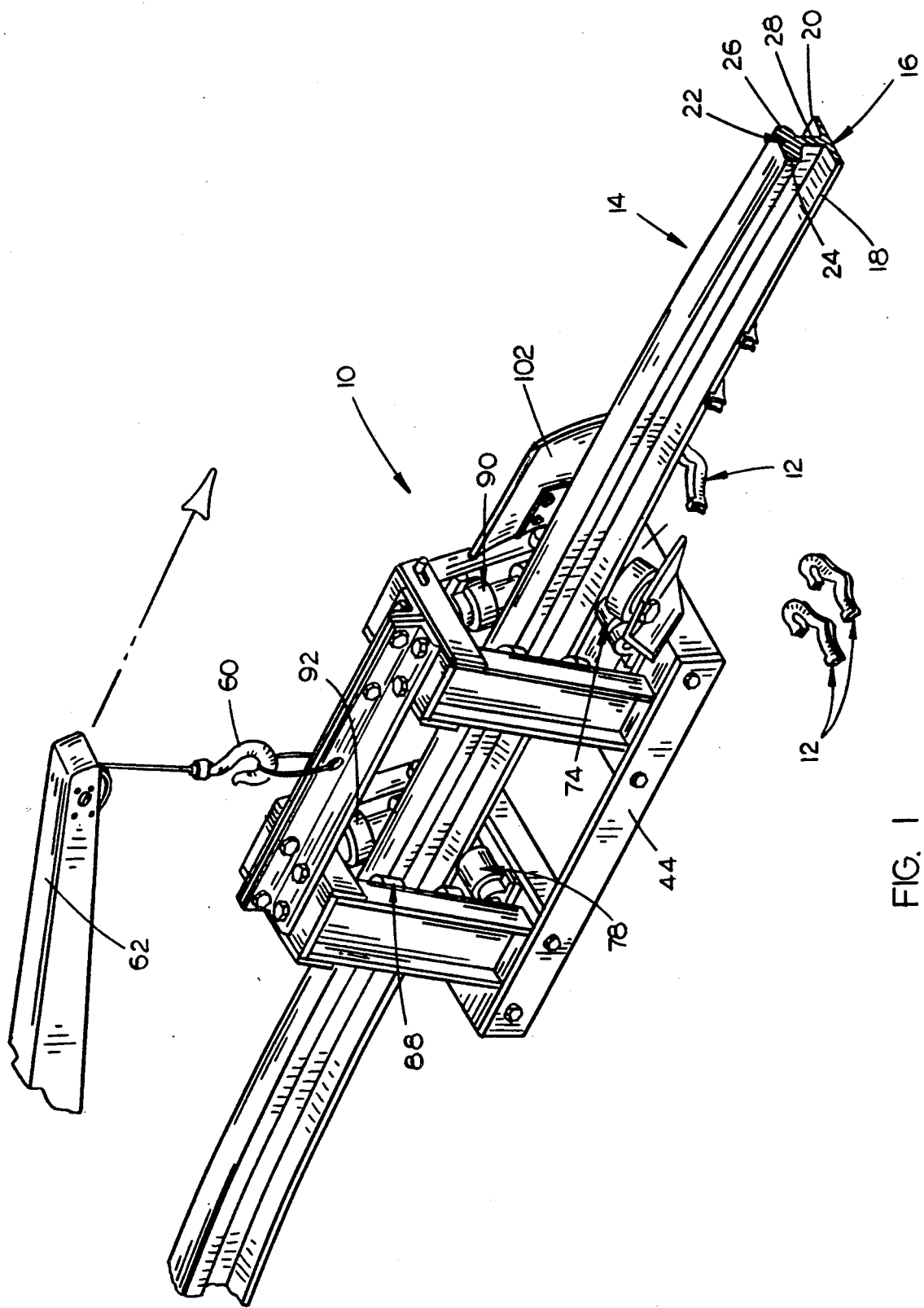

An apparatus is described for removing drive-on rail anchors which are positioned along the length of a rail. The apparatus is supported by a crane which moves along the track and which lifts the apparatus and the rail from the cross ties after the spikes have been removed from the tie plates. The apparatus includes a lower frame having spaced apart rail supporting rollers which engage the underside of the rail base. A pair of side frames extend upwardly and inwardly in a converging relationship on opposite sides of the rail and which are provided with guide rollers which engage opposite sides of the rail head and opposite sides of the rail base to properly position the rail within the apparatus and to urge the rail downwardly into engagement with the rail supporting rollers. A roller is positioned at the forward end of the apparatus and engages one end of the rail anchor as the apparatus is moved along the length of the rail to release the anchor from the rail. A roller is also provided at the other end of the apparatus on the same side as the front cam to enable the apparatus to be moved in opposite directions along the length of the rail as desired.

DESCRIPTION OF PREFERRED EMBODIMENT

The rail anchor remover of this invention is referred to generally by the reference numeral 10 and is designed to remove drive-on rail anchors 12 from a rail 14. Rail 14 is conventional in design and includes a base 16 having opposite sides 18 and 20, head 22 having opposite sides 24 and 26, and web 28.

Figures 3, 4:
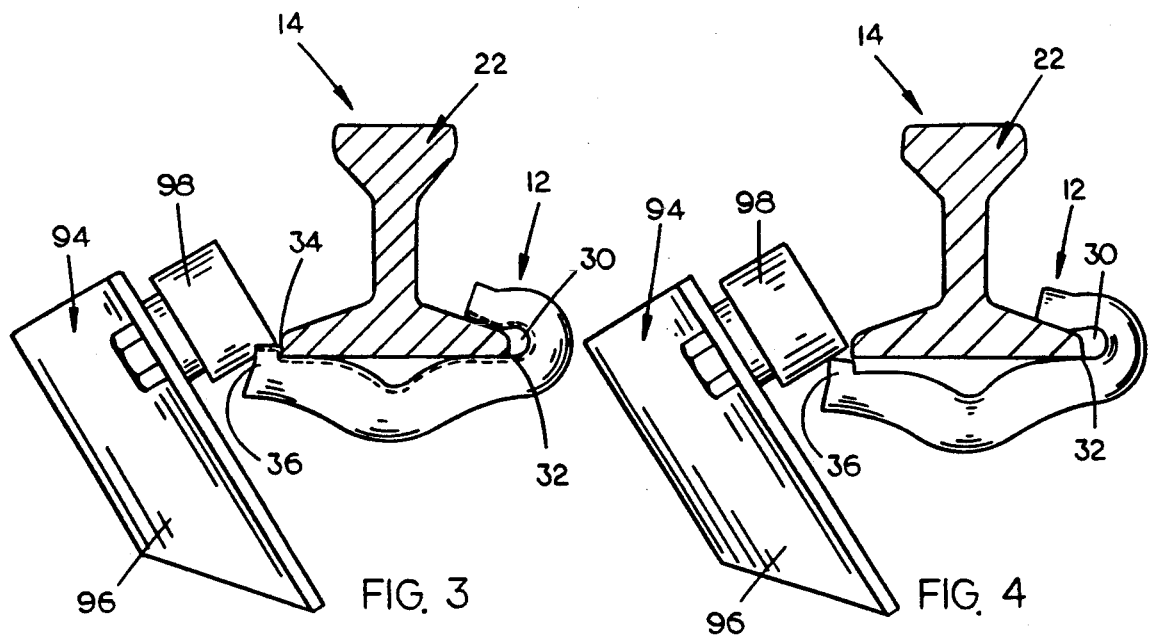
FIG. 3 is a sectional view illustrating the roller of this invention about to engage a rail anchor.
FIG. 4 is a view similar to FIG. 3 except that the roller has engaged one end of the rail anchor and has loosened the same and is removing the anchor therefrom.

Rail anchor 12 is referred to as a Channeloc heavy duty deep droop type such as manufactured by Chemetron Railway Products, Inc. of Wheeling, Ill., but may be of other design or manufacture. Anchor 12 includes a throat 30 which extends around one of the sides of the rail base 16. Anchor 12 also includes a shoulder 32 which abuts the side of the rail base embraced by throat 30 and a shoulder 34 which abuts the other side of the rail base. When the anchor 12 is mounted on the rail 14, end 36 is positioned adjacent the rail base as seen in FIG. 3.

Rail anchor remover 10 includes a lower frame 38 having a forward end 40, a rearward end 42 and opposite side 44 and 46. Side frame 48 extends upwardly and inwardly from side 44 of lower frame 38 and is comprised of a pair of frame members 50 and 52 having channel members 54 and 56 secured to the upper ends thereof. Support 58 is secured to channel members 54 and 56 and extends therebetween as seen in the drawings. Support 58 is designed to be connected to the lifting hook 60 of a conventional crane 62 which will be moved along the length of the track during the rail anchor removal operation.

Side frame 64 is provided at side 46 of lower frame 38 and extends upwardly and inwardly therefrom as seen in the drawings. Side frame 64 includes frame members 66 and 68 which are pivotally secured to lower frame 38 at 67 and 69 respectively. The upper ends of the frame members 66 and 68 are selectively removably secured to channel members 54 and 56 by pins 70 and 72 respectively. The pivotal mounting of the frame members 64 and 66 permits the side of the apparatus to be opened (FIG. 2) so that the rail 14 may be positioned in the apparatus as seen in FIG. 1.

A pair of rail supporting rollers 74 and 74' are rotatably mounted, about a horizontal axis, on lower frame 38 adjacent the forward end thereof as seen in the drawings. Rollers 74 and 74' include recessed portions 76 and 76' formed in the peripheries thereof respectively for receiving the base of the rail to aid in maintaining the rail in the proper position in the rail anchor remover. Rail supporting rollers 78 and 78' are mounted on lower frame 38 adjacent the rearward end thereof as seen in the drawings and also have recessed portions 80 and 80' formed therein respectively for receiving the base of the rail.

A rail engaging roller 82 is mounted at the inside surface of frame member 50 and includes roller portion 84 which engages one side of the rail head 22 and a roller portion 86 which engages one side of the rail base 16. Similarly, rail engaging roller 88 is mounted on the inside surface of frame member 52 and includes roller portions which engage the sides of the rail head 22 and rail base 16 in the same manner as roller portions 84 and 86. Rollers 82 and 88 exert downward and inward force on the rail to maintain the rail in position on the rollers 74, 74', 78 and 78'. Similarly, rollers 90 and 92 are mounted on the inside surfaces of frame members 66 and 68 for engaging the other side of the rail head 22 and rail base 16 to urge the rail 12 downwardly and inwardly into engagement with the rollers 74, 74', 78 and 78'.

A rail anchor engagement means 94 is provided at the forward end of lower frame 38 for removing the rail anchors from the rail. Means 94 is comprised of a bracket 96 secured to the forward end of lower frame 38 and which has a roller 98 rotatably mounted thereon which engages the end 36 of the rail anchor to force the end 36 of rail anchor 12 out of engagement with the rail base as the apparatus is moved along the length of the rail. The rotational axis of roller 98 is inclined with respect to the horizontal so that the roller 98 exerts downward and inward force on the end 36 of rail anchor 12 to release the rail anchor from the rail base so that the said anchor 12 "springs" outwardly from the rail.

A rail anchor engagement means 94' is provided at the rearward end of lower frame 38 for removing rail anchors from the rail when the rail anchor remover is being moved in an opposite direction to that just described.

Figure 2:
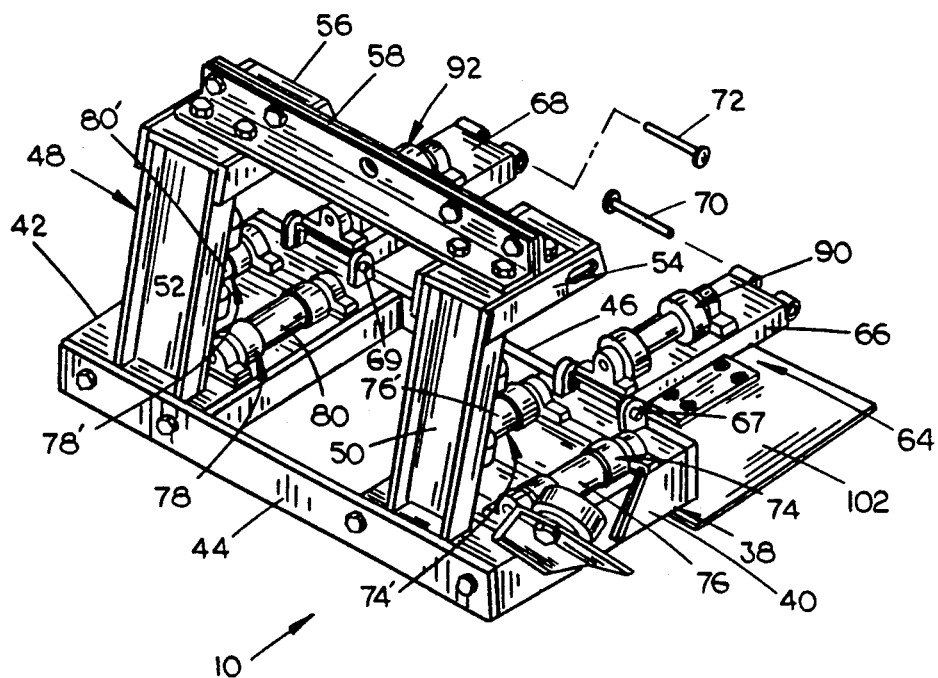
FIG. 2 is a perspective view of the rail remover of this invention with one of the side frame members having been pivoted to an open position to facilitate a rail being placed therein.
Figure 5:
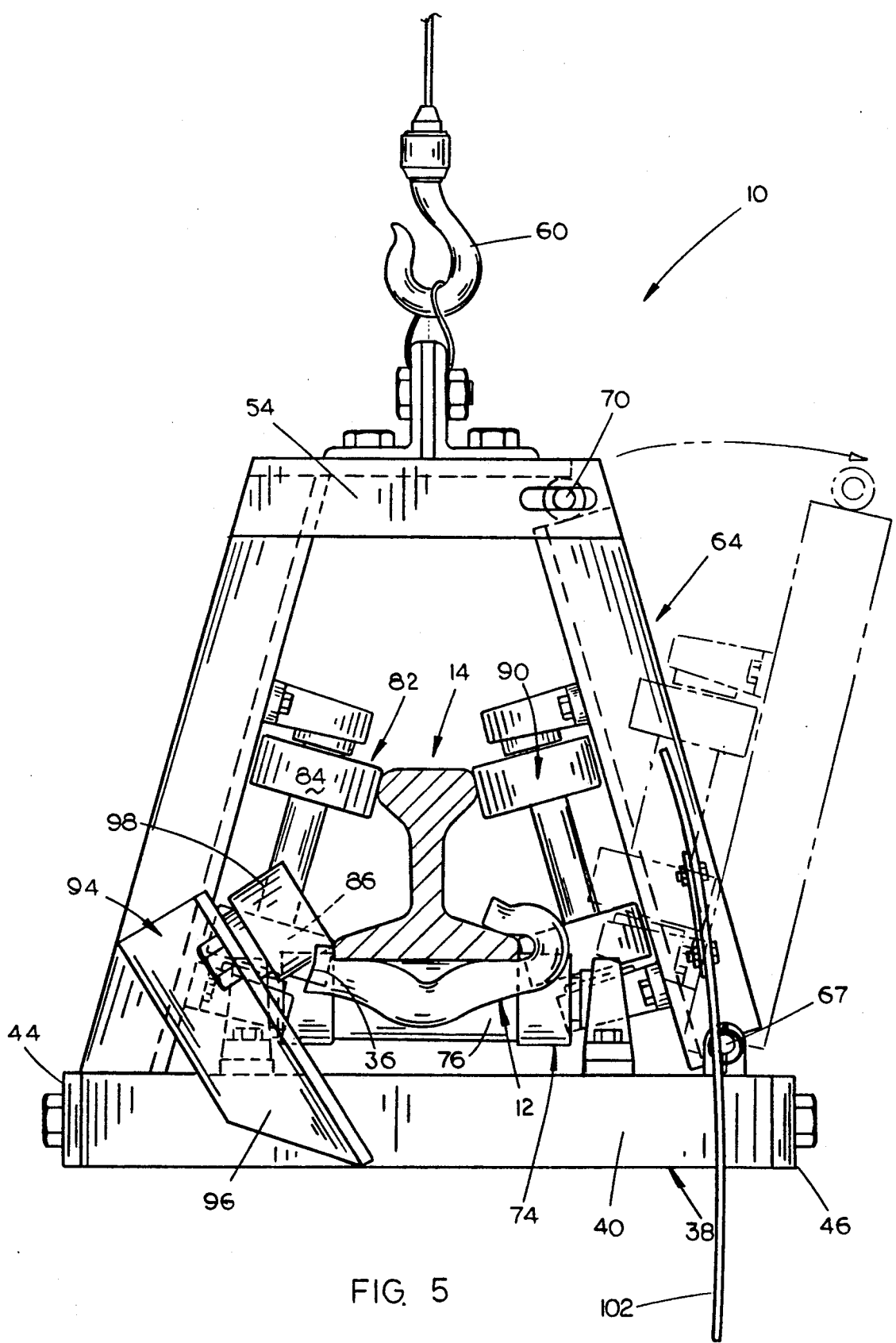
FIG. 5 is an end view of the apparatus of this invention.
Figure 6:
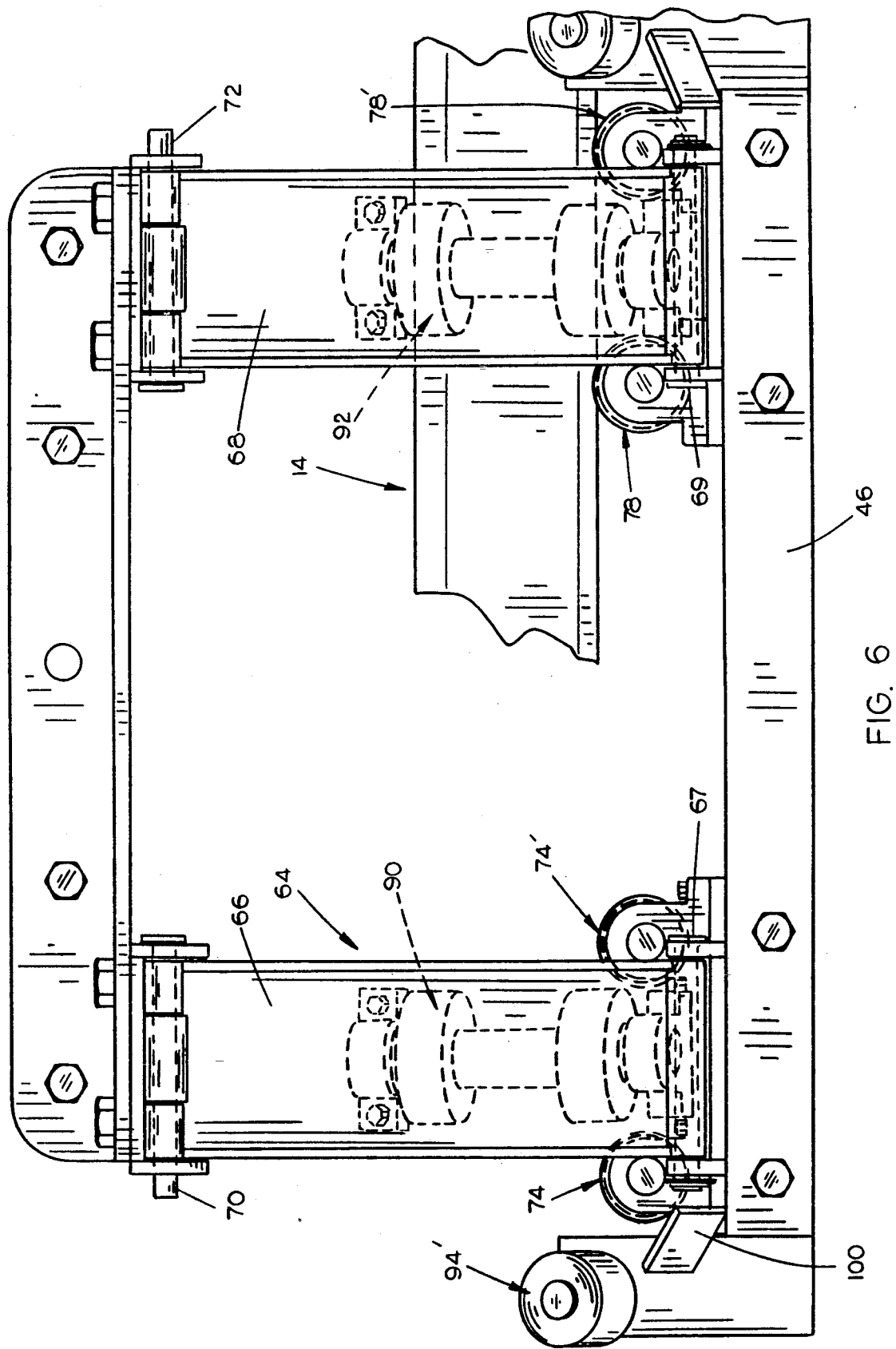
FIG. 6 is a side elevational view of the invention.

In operation, when a rail is to be replaced or renovated, the spikes securing the rail to the cross ties are first removed. One end of the rail is then lifted upwardly by any convenient means to enable the rail anchor remover of this invention to be positioned thereunder. The pins 70 and 72 are removed from the upper ends of frame members 66 and 68 respectively to enable the frame members to be pivoted to the open position as illustrated in FIG. 2. The rail anchor remover is then positioned with respect to the suspended rail so that the base of the rail is positioned on the recessed portions 76, 76', 80 and 80' of the rollers 74, 74', 78 and 78' respectively. The frame members 66 and 68 are then pivotally moved to their closed position and the pins 70 and 72 are reinstalled. When the rail is positioned in the remover as illustrated in FIG. 5, the rollers 82 and 88 engage one side of the rail while the rollers 90 and 92 engage the other side of the rail to positively maintain the rail in the proper position with respect to the rail anchor remover.

The crane being utilized in the operation is then operated to cause the rail anchor remover 10 of this invention to be moved longitudinally with respect to the rail. As the remover is moved longitudinally with respect to the rail, cam follower roller 98 engages the end 36 of the anchor to force the anchor downwardly from the rail or to release the anchor from the rail. When so released, the anchor "springs" sidewardly from the rail as illustrated in FIG. 4. In the event that the anchor is not completely released from the rail, finger 100 sweeps or brushes the anchor from the rail. The crane can also cause the rail to be placed outside the track simultaneously with the rail anchor removing operation. Deflector shield 102 is provided so that the anchors, as they are removed from the rail, strike the same and are deflected downwardly unto the road bed for subsequent retrieval.

Thus it can be seen that the rail anchor remover of this invention accomplishes at least all of its stated objectives.

I claim:

1. A rail anchor remover for removing rail anchors mounted on a rail, the rail including a base and a head, the anchors being mounted on the base of the rail, comprising,
    a substantially horizontally disposed lower frame having a forward end, a rearward end, and opposite sides,
    at least one rail supporting roller means rotatably mounted, about a horizontal axis, on said lower frame adjacent the forward end thereof,
    at least one rail supporting roller means rotatably mounted, about a horizontal axis, on said lower frame adjacent the rearward end thereof,
    a first side frame mounted at one side of said lower frame and extending upwardly therefrom, said first side frame having rearward and forward ends,
    at least one rail engaging roller means rotatably mounted on said first side frame for engaging one side of the rail,
    a second side frame mounted at the other side of said lower frame and extending upwardly therefrom, said second side frame having rearward and forward ends,
    means operatively connecting the upper ends of said side frames,
    at least one rail engaging roller means rotatably mounted on said second side frame for engaging the other side of the rail,
    and a rail anchor engaging means mounted on said lower frame adjacent the forward end thereof for engaging one end of the rail anchor and to exert downward force thereon to release the rail anchor from the rail as the rail anchor remover is moved longitudinally with respect to the rail.

2. The rail anchor remover of claim 1 wherein said rail anchor engaging means comprises a rotatable roller.

3. The rail anchor remover of claim 2 wherein said roller is positioned so as to exert downward and sideward force on the said one end of the rail anchor.

4. The rail anchor remover of claim 1 wherein a rail anchor engaging means is also positioned adjacent the rearward end of the apparatus to enable the apparatus to function whether the rail anchor is either forwardly or rearwardly on the rail.

5. The rail anchor remover of claim 1 wherein the lower end of one of one of said side frames is pivotally mounted on said lower frame, the upper end of said one side frame being removably secured to said means connecting the upper ends of said side frames to permit the rail to be selectively positioned between the said side frames.

6. The rail anchor remover of claim 1 wherein a pair of the said rail supporting rollers are rotatably mounted on said lower frame adjacent the forward end thereof.

7. The rail anchor remover of claim 1 wherein a pair of the said rail supporting rollers are rotatably mounted on said lower frame adjacent the rearward end thereof.

8. The rail anchor remover of claim 1 wherein a pair of the said rail supporting rollers are rotatably mounted on said lower frame adjacent the rearward end thereof.

9. The rail anchor remover of claim 1 wherein said rail supporting rollers have reduced diameter portions which receive the rail base.

10. The rail anchor remover of claim 1 wherein said rail-engaging rollers are inclined at an angle with respect to said rail, each of said rail-engaging rollers including an upper portion which engages one side of the rail head and a lower portion which engages one side of the rail base.

11. The rail anchor remover of claim 1 wherein said rail engaging rollers are positioned adjacent the forward ends of said side frames.

12. The rail anchor remover of claim 1 wherein said rail anchor engaging means is positioned forwardly of the forward end of said one side frame.

13. The rail anchor remover of claim 2 wherein the rotational axis of said roller is disposed so that said roller exerts downward and sideward force on the said one end of the rail anchor.

14. The rail anchor remover of claim 1 wherein said second side frame is selectively pivotally mounted on said lower frame and is movable between operative and inoperative positions, and means operatively selectively securing the upper end of said second side frame to the upper end of said first side frame.

15. The rail anchor remover of claim 14 wherein an upper frame is secured to and extends between the upper ends of said first and second side farmes.

16. The rail anchor remover of claim 1 wherein an anchor deflector means is mounted adjacent the forward end of said lower frame for deflecting the removed anchors downwardly onto the road bed.

* * * * *